May 30, 1939.  K. E. B. STENBERG  2,160,762
COMBINATION INTEGRAL TRANSPARENT MEMBER AND ESCUTCHEON FRAME
Filed Dec. 8, 1937  2 Sheets-Sheet 1
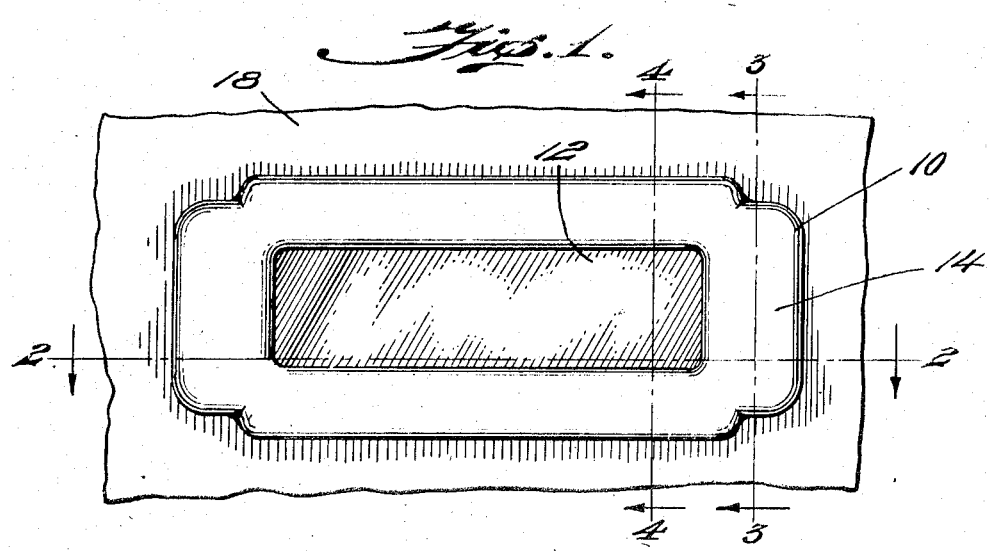
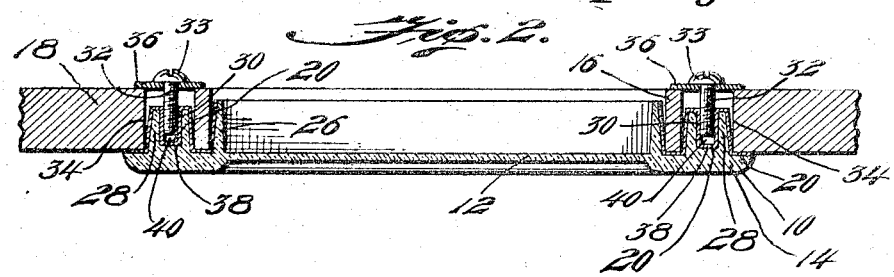
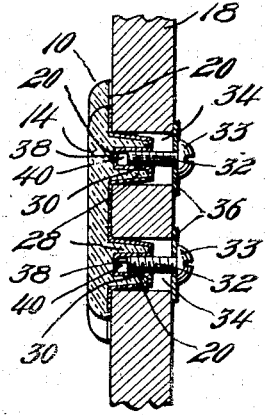
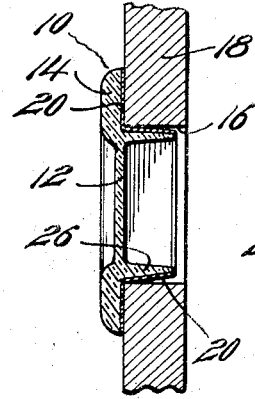
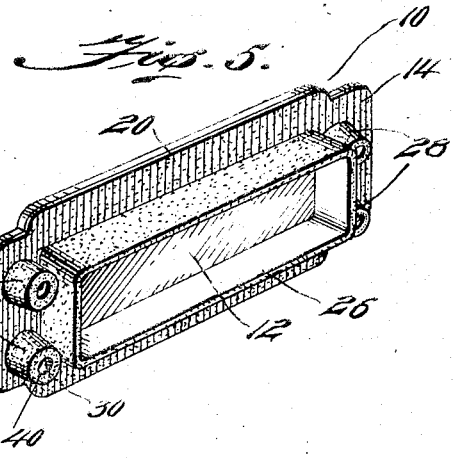
Inventor
Knut E. Birger Stenberg
By Thomas A. Jenckes
Attorney May 30, 1939.   K. E. B. STENBERG   2,160,762
COMBINATION INTEGRAL TRANSPARENT MEMBER AND ESCUTCHEON FRAME
Filed Dec. 8, 1937   2 Sheets-Sheet 1
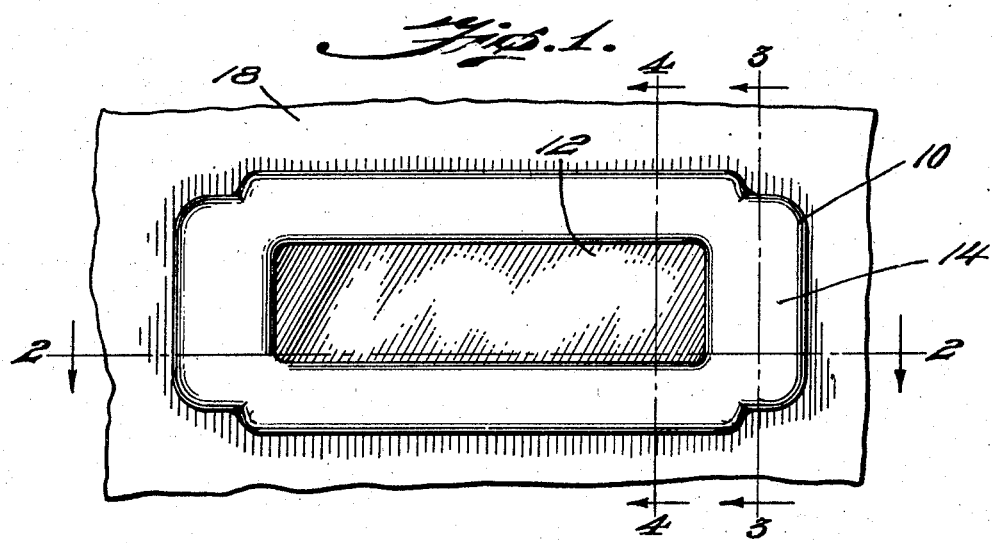
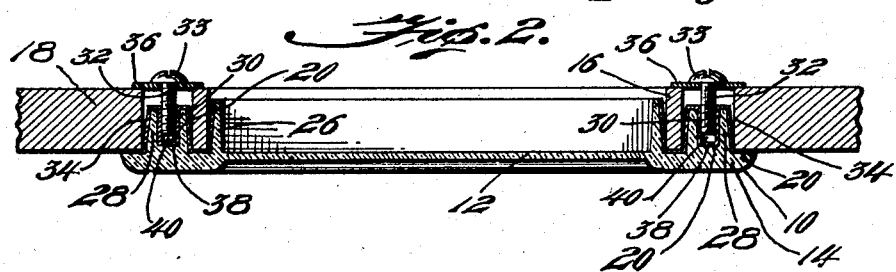
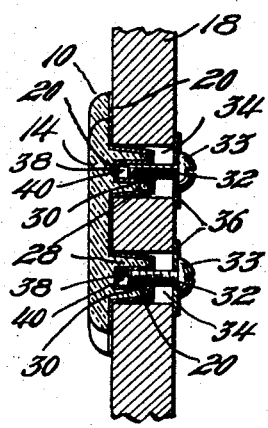 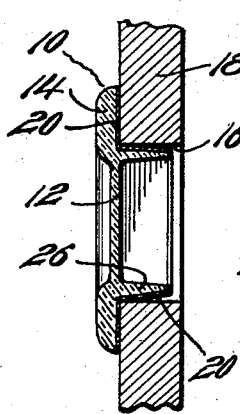 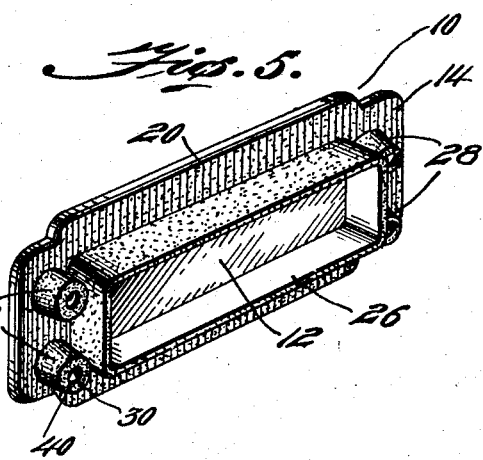
Inventor
Knut E. Birger Stenberg
By Thomas A. Jenckes
Attorney Patented May 30, 1939

2,160,762

UNITED STATES PATENT OFFICE 2,160,762

COMBINATION INTEGRAL TRANSPARENT MEMBER AND ESCUTCHEON FRAME

Knut E. Birger Stenberg, Attleboro, Mass., assignor to Associated Attleboro Manufacturers, Attleboro, Mass., a corporation of Massachusetts Application December 8, 1937, Serial No. 178,751

10 Claims. (Cl. 189—64)

My invention relates to improvements in combination integral transparent members and escutcheon frames constructed of a transparent synthetic resin of the methyl-methacrylate type, or other transparent synthetic material, having a center portion molded into a flat sheet simulative of glass and a transparent border portion molded integral therewith in the shape of an escutcheon frame. The rear surface of the border portion or escutcheon frame is then preferably covered with a covering, such as metallic paint, metal foil, or otherwise, to produce an effect in said escutcheon portion when viewed from in front of solid metal, wood or other border material.

In the prior art for use in radios, automobile dashboards and other panels a separate, usually metallic escutcheon border frame has been provided for attachment in a hole in a wall or other solid structure, such as a radio wall or automobile dashboard, and a separate transparent sheet of glass has been suitably mounted within said metallic escutcheon or border frame. This has not only necessitated the expense of making and individually attaching two separate members, but has required the use of expensive materials.

An object of my invention, therefore, is to provide a unitary integral article of relatively inexpensive material which can be molded as one unit and also attached in position as one unit in one operation.

A further object of my invention is to provide a combination transparent member and escutcheon frame of more pleasing appearance and in any desired color scheme as the light refracted through the transparent front portion of the panel and reflected against the opaque metal, wood or other border material simulative covering on the rear produces pleasing color effects not produced by a frame constructed of metal, wood, or other suitable border material.

A further feature of my invention is that it makes possible the provision of an attaching structure for escutcheon frames of a type which will be invisible when viewed from the front of my improved combination member in attached position and in one embodiment of which, particularly as hollow bosses are provided, the interior of the bosses may also be covered with said covering to conceal the means of attachment when viewed from in front.

A further object of my invention is to provide an escutcheon frame which may be ornamentally shaped in any desired fashion or provided with any desired type of molded surface ornamentation and if desired having molded insignia, such as in use for radio or speedometer purposes integrally molded thereon.

These and such other objects of my invention as may hereinafter appear will be best understood from a description of the accompanying drawings, which illustrate two different embodiments thereof.

In the drawings,

Fig. 1 is a front elevation of a combination integral transparent member and escutcheon frame of a type suitable for an automobile dashboard or radio wall in attached position thereon.

Fig. 2 is a longitudinal section taken along the line 2—2 of Fig. 1.

Fig. 3 is a vertical section taken along the line 3—3 of Fig. 1.

Fig. 4 is a vertical section taken along the line 4—4 of Fig. 1.

Fig. 5 is a rear perspective view of my improved combination integral transparent member and escutcheon frame in detached position.

Fig. 6 is a front elevation of a portion of a radio cabinet with an alternative type of combination integral transparent member and escutcheon frame attached to the front wall thereof.

Fig. 7 is a rear elevation of the parts shown in Fig. 6.

Fig. 8 is a vertical sectional view taken along the line 8—8 of Fig. 6.

Fig. 9 is a front perspective view of the embodiment of my invention shown in Fig. 6. in detached position.

In the drawings, wherein like characters of reference generally indicate like parts throughout, 10 generally indicates a combination integral transparent member and escutcheon frame constructed in accordance with my invention. As stated hitherto, in the prior art metallic escutcheon frames have been provided with central transparent glass insets and an object of my invention is to provide a combination one-piece device including an integral transparent member and escutcheon frame which may be molded in a one-piece operation as a single unit for a single attaching operation to a hole in a wall or other solid structure. While my improved device may be constructed of any suitable type of transparent synthetic material, it is preferably constructed of methyl methacrylate of the types shown in Patents #1,980,483, #2,008,719, etc., although if desired it may be constructed of other moldable transparent synthetic materials of equivalent or suitable type.

The suitable transparent synthetic material is molded into a flat transparent synthetic sheet 12 simulative of glass and a transparent border portion 14 molded integrally therewith in the shape of an escutcheon frame of any desired shape, the front portion of said border portion 14 projecting forwardly from said center portion to permit said center portion 12 to be inset within said border portion in a manner simulative of former types of independent glass portions and separate metallic frames.

While my improved device may be cemented to or otherwise secured to the wall or other solid structure provided with a hole therein which said transparent sheet 12 is adapted to cover, my improved device 10 is preferably provided with suitable means integrally projecting therefrom in an invisible manner when viewed from the front of my device in attached position for the detachable securement of said device in the hole 16 therefor in the wall 18 or other solid structure for displaying said transparent sheet 12 in front of said hole and also displaying when viewed from in front, the transparent border 14.

To give the frame portion an appearance simulative of solid metal, wood or other border material, I preferably, by means of attaching metallic foil, painting or otherwise, provide a metallic or wood simulative covering 20 on the rear of said border portion 14 to produce an effect in said escutcheon frame border portion when viewed from in front of solid metal, wood or other border material.

As the center transparent portion 12 and frame portion 14 are preferably simultaneously molded, it is obvious that the front portion of the border portion 14 may be readily shaped in any desired shape and provided with any desired type of surface ornamentation. As escutcheon frames of this type may often be used in association with pointer members, such as the pointer member 22' shown in Fig. 6 for radio purposes or speedometer or other purposes, it is obvious that the front portion of the frame portion 14' may be simultaneously molded or otherwise provided with dial or other insignia 24' thereon and a suitable pointer hole 17, if desired.

I have shown in Figs. 1-4 one embodiment of my invention particularly adapted for use as a combination integral transparent member and escutcheon frame device to provide a combination transparent member and border, for a suitable hole in a wall or other solid structure, such as a radio wall or automobile dashboard wall 18 shown. In the embodiment shown in Fig. 1, the border portion 14 projects outwardly over the front edge of the wall adjacent said hole and if desired is provided with a portion 26 projecting integrally inwardly from the inner edge of the border portion to align the member 10 within the hole 16. Any suitable type of means integrally projecting from said member 10 in an invisible manner when viewed from the front of the device in attached position for the detachable securement of said device in a hole therefor in a wall or other solid structure for displaying said center transparent sheet in front of or in said hole and said border may be provided. In the embodiment shown in Figs. 1-5 for this purpose, a plurality of spaced hollow bosses 28 projecting rearwardly from the rear wall of said frame 14 are provided; in the embodiment shown, two of said hollow bosses 28 being provided at each end of the frame 14. Said bosses are preferably internally threaded at 30 to receive screw means 32 having headed portions 33 abutting the rear edges of said wall 18 or other solid structure to clamp the border portion 14 of said device to said wall 18, said bosses 28 and screw means 32, as shown in Fig. 2, preferably extending through suitable supplemental holes 34 for this purpose in said wall adjacent the display hole 16. In the embodiment shown supplemental washers 36 are provided to be clamped by the screw heads 33 to abut the portions of the rear surface of said wall 18 adjacent each supplemental hole 34. The covering 20 for the rear surface of said border portion 14 to produce an effect in said escutcheon frame portion when viewed from in front of solid metal, wood or other border material is also provided, but to positively conceal the means of attachment of said member 10 to said wall 18, the bottoms 38 of the boss holes 40 are also provided with said simulative covering 20 so that when the border portion is viewed from in front, its means of attachment to the wall will be entirely concealed.

In the embodiment of my invention shown in Figs. 6-9, I have provided an alternative type of means projecting integrally from said border portion for the detachable securement of the device in the display hole 16' therefor in the wall 18' or other solid structure for displaying said transparent sheet 12' over said display hole 16' and said border 14'. I have shown in Figs. 6-9 an embodiment of my invention adapted to be used with a detachable panel or wall 18' for the front of a small-sized radio cabinet, more particularly for a type of front panel 18' shown in my patent for Composition panel cabinet assembly, particularly adapted for use in molded radio cabinets, patented November 23, 1937, No. 2,100,226.

In this type of device, or whatever type of a wall 18' may be employed, a suitable hole 16' is provided therefor in said wall 18' and as shown both the transparent portion 12' and the border portion 14' are preferably of a size to be contained within said hole so that in the embodiment shown the border portion 14' and inset transparent portion 12' may project forwardly from the rear of said hole. As means to detachably secure my improved device to the wall 18' adjacent said hole 16', I provide the flange 40' projecting radially therefrom, in the embodiment shown at the rear edge of said border portion 14'. Said flanges have means 42' therein, for attaching said device to the rear surface of a wall or other solid structure having said hole 16' therein for displaying said center transparent sheet 12' and border 14' therein, said means in my improved embodiment comprising the holes 42' at spaced distances circumferentially thereof. To cooperate with said holes 42', the rear surface of said panel or wall 18' may be provided with projections 44' of the type shown in my patent application for Composition panel cabinet assembly, particularly adapted for use in molded radio cabinets, Ser. No. 130,364, filed March 11, 1937 similarly equi-distantly spaced to said holes 42' to project rearwardly from the rear wall of said panel 18' adjacent said hole 16'. To secure the improved device 10' to said panel or wall 18' it is apparent that it is merely necessary to bring the border portion 14' adjacent said projections 44' and insert the projections 44' through said holes 42', the border portion 14' and integral transparent sheet 12' projecting forwardly through said hole 16'. Said flange 40' may then be secured to said panel 18' by means of the detachable clamps 48 shown or by other suitable means. Said clamps are of preferably rectangular shape and have the spring tongues 50 diametrically struck up therefrom each provided with a V-shaped or arcuate notch 52 in the end thereof, the edges of said notches thus forming a central hole 54. The body of the clamp is then laid over the end of a projection 44' and pressed inwardly against the flange 40' so that said projection 44' may extend through the central hole 54 thereof, the spring tongues 52 flexing upwardly against the wall of the projection 44' to have the notches 52 in the ends thereof engage diametrically opposite portions of the wall of said projection to retain said flange 40' in position on the wall 18'. While I preferably employ this simple type of detachable clamp, it is obvious that any other type of clamp may be employed for this purpose if desired. To give the frame portion an appearance simulative of solid metal, wood or other border material, I also, by means of attaching metallic foil, painting or otherwise, provide a metallic or wood simulative covering 20' on the rear of said border portion 14' to produce an effect in said escutcheon frame border portion when viewed from in front of solid metal, wood or other border material.

It is thus apparent that I have provided a novel type of combination integral transparent member and escutcheon frame device with the advantages explained above.

It is understood that my invention is not limited to the specific embodiments shown and that various deviations may be made therefrom without departing from the spirit and scope of the appended claims.

What I claim is:

1. A combination integral transparent member and escutcheon frame device, comprising transparent synthetic material molded into a flat central inset transparent sheet simulative of glass, and a transparent border portion molded integrally therewith in the shape of an escutcheon frame projecting forwardly from said center portion having means integrally projecting therefrom in an invisible manner when viewed from the front of the device in attached position for the detachable securement of said device in a hole therefor in a wall or other solid structure for displaying said center transparent sheet and border portion, and a covering on the rear of said border portion to produce an effect in said escutcheon frame portion when viewed from in front simulative of solid metal, wood or other border material, said frame portion also having visible insignia molded thereon.

2. A combination integral transparent member and escutcheon frame device, comprising transparent synthetic material molded into a flat central transparent sheet simulative of glass, and a transparent border portion molded integrally therewith in the shape of an escutcheon frame having means integrally projecting therefrom for the detachable securement of said device in a hole therefor in a wall or other solid structure for displaying said center transparent sheet and border portion, and a covering on the rear of said border portion to produce an effect in said escutcheon frame portion when viewed from in front simulative of solid metal, wood or other border material.

3. A combination integral transparent member and escutcheon frame device, comprising transparent synthetic material molded into a flat central inset transparent sheet simulative of glass, and a transparent border portion molded integrally therewith in the shape of an escutcheon frame projecting forwardly from said center portion, and a covering on the rear of said border portion to produce an effect in said escutcheon frame portion when viewed from in front simulative of solid metal, wood or other border material.

4. A combination integral transparent member and escutcheon frame device, comprising transparent synthetic material molded into a flat central transparent sheet simulative of glass, and a transparent border portion molded integrally therewith in the shape of an escutcheon frame, and a covering on the rear of said border portion to produce an effect in said escutcheon frame portion when viewed from in front simulative of solid metal, wood or other border material.

5. A combination integral transparent member and escutcheon frame device, comprising transparent synthetic material molded into a flat central transparent sheet simulative of galss, and a transparent border portion molded integrally therewith in the shape of an escutcheon frame having a flange projecting radially therefrom having means thereon for attaching said device to the rear surface of a wall or other solid structure having a hole therein for displaying said central transparent sheet therein, and a covering on the rear of said border portion to produce an effect in said escutcheon frame portion when viewed from in front simulative of solid metal, wood or other border material.

6. A combination integral transparent member and escutcheon frame device, comprising transparent synthetic material molded into a flat central transparent sheet simulative of glass, and a transparent border portion molded integrally therewith in the shape of an escutcheon frame having a flange projecting radially therefrom having holes for attaching said device to the rear surface of a wall or other solid structure having a hole therein for displaying said central transparent sheet therein, and a covering on the rear of said border portion to produce an effect in said escutcheon frame portion when viewed from in front simulative of solid metal, wood or other border material.

7. A combination integral transparent member and escutcheon frame device, comprising transparent synthetic material molded into a flat central transparent inset sheet simulative of glass, and a transparent border portion molded integrally therewith in the shape of an escutcheon frame projecting forwardly from said sheet having a flange projecting radially therefrom at the rear edge thereof having means thereon for attaching said device to the rear surface of a wall or other solid structure having a hole therein for displaying said central transparent sheet and border portion therein, and a covering on the rear of said border portion to produce an effect in said escutcheon frame portion when viewed from in front simulative of solid metal, wood or other border material.

8. A combination integral transparent member and escutcheon frame device, comprising transparent synthetic material molded into a flat central transparent sheet simulative of glass, and a transparent border portion molded integrally therewith in the shape of an escutcheon frame having spaced hollow internally threaded bosses projecting integrally rearwardly therefrom to receive screw means projecting through holes in and having the heads thereof abutting the rear edge of a wall or other solid structure having a hole therein for displaying said transparent central portion therein to clamp said frame portion against the front surface of said wall adjacent said hole, and a covering on the rear of said border portion and in the bottom of said boss holes to conceal the means of attachment of said frame thereto and to produce an effect in said escutcheon frame portion when viewed from in front simulative of solid metal, wood or other border material, said frame portion having a projection projecting integrally rearwardly from the inner edge thereof to align said member within the hole.

9. A combination integral transparent member and escutcheon frame device, comprising transparent synthetic material molded into a flat central transparent sheet simulative of glass, and a transparent border portion molded integrally therewith in the shape of an escutcheon frame having spaced hollow internally threaded bosses projecting integrally rearwardly therefrom to receive screw means projecting through holes in and having heads thereof abutting the rear edge of a wall or other solid structure having a hole therein for displaying said transparent central portion therein to clamp said frame portion against the front surface of said wall adjacent said hole, and a covering on the rear of said border portion and in the bottom of said boss holes to conceal the means of attachment of said frame thereto and to produce an effect in said escutcheon frame portion when viewed from in front simulative of solid metal, wood or other border material.

10. A combination integral transparent member and escutcheon frame device, comprising transparent synthetic material molded into a flat central transparent sheet simulative of glass, and a transparent border portion molded integrally therewith in the shape of an escutcheon frame having spaced hollow internally threaded bosses projecting integrally rearwardly therefrom to receive screw means projecting through holes in and having heads abutting the rear edge of a wall or other solid structure having a hole therein for displaying said center portion therein to clamp said frame portion against the front surface of said wall adjacent said hole, and a covering on the rear of said border portion to produce an effect in said escutcheon frame portion when viewed from in front simulative of solid metal, wood or other border material.

KNUT E. BIRGER STENBERG.